United States Patent Office 3,812,145
Patented May 21, 1974

3,812,145
PROCESS FOR THE PREPARATION OF PYRAZOLONE DERIVATIVES
Hiroshi Sato, Daijiro Nishio, and Takeshi Takahashi, Kanagawa, Japan, assignors to Fuji Photo Film Co., Ltd., Kanagawa, Japan
No Drawing. Filed Dec. 3, 1971, Ser. No. 204,685
Claims priority, application Japan, Dec. 4, 1970, 45/106,715
Int. Cl. C07d 49/18
U.S. Cl. 260—310 A    17 Claims

ABSTRACT OF THE DISCLOSURE

A process for the preparation of pyrazolone derivatives represented by the following formula

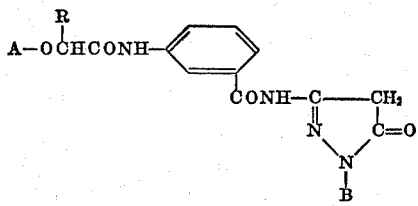

wherein R represents a member selected from the group consisting of a hydrogen atom or an alkyl group having 1–6 carbon atoms, A represents

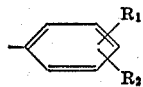

wherein $R_1$ is a member selected from the group consisting of a hydrogen atom or an alkyl group and $R_2$ is an alkyl group, and B represents

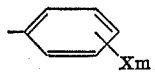

wherein X, which may be the same or different, represents at least one member selected from the group consisting of a hydrogen atom, an alkyl group, an alkoxy group, an aryl group, an aryloxyl group, a cyano group, or a halogen atom and m is 1–5, which comprises condensing, in acetonitrile, a compound represented by the general formula

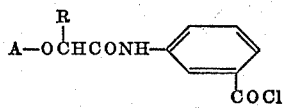

wherein A and R have the same meanings as defined above, with a compound represented by the general formula

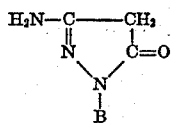

wherein B has the same meaning as defined above.

BACKGROUND OF THE INVENTION

Field of the invention

The present invention relates to a process for the preparation of pyrazolone derivatives suitable for use as magenta couplers for color photography.

Description of the prior art

It is disclosed in the specifications of U.S. Pat. Nos. 2,600,788 and 3,062,653 that the pyrazolone derivative having the following general formula (I)

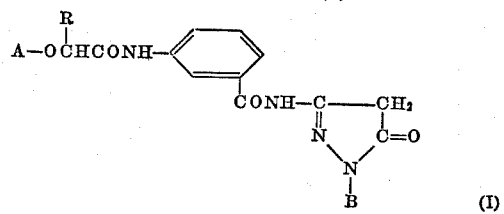

wherein A represents

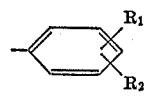

(wherein $R_1$ is a hydrogen atom or an alkyl group and $R_2$ is an alkyl group), R represents a hydrogen atom or an alkyl group having 1–6 carbon atoms, and B represents

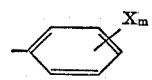

(wherein X is a hydrogen atom, an alkyl group an alkoxyl group, an aryl group, an aryloxyl group, a cyano group, or a halogen atom and m is 1–5, said X may be the same or different when m is 2 or more) is particularly useful as a magenta coupler for color photography by a subtractive color process.

There is described in the above patents a typical process for producing such compounds in which a corresponding 1-aryl-3-amino-5-pyrazolone is reacted with m-nitrobenzoyl chloride, the nitro group of the product is reduced into an amino group, and then the resulting product is reacted with a chloride of 2,4-di-sec(or tert)-amylphenoxyacetic acid (or propionic acid or butyric acid) or 3-pentadecylphenoxyacetic acid (or propionic acid or butyric acid). The reaction is shown by the following schematic:

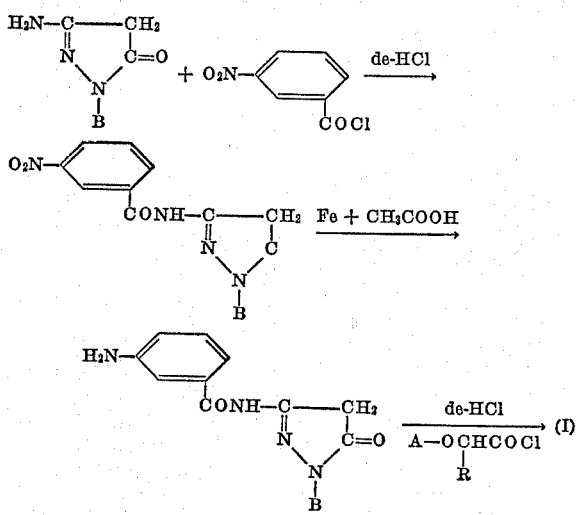

However, the conventional process has the following two fundamental faults: (1) aminopyrazolone which is expensive and thermally unstable must be reacted at the initial step of the process of preparation; and (2) the reduction of the nitro group of the m-nitro-benzoylated aminopyrazolone as the intermediate product is comparatively difficult. Because, the nitrobenzoylamide pyrazolone intermediate product is only weakly soluble in the solvents used, a large quantity of acetic acid must be used as the solvent in the chemical reduction thereof with iron powder, whereby the amino group of the product is acetylated with acetic acid and complicated procedures and required for the removal thereof, and product yield is greatly reduced.

Other reduction modes such as a catalytic reduction and other chemical reductions may be employed, but they are inferior economically to reduction by iron powder.

SUMMARY OF THE INVENTION

It is an object of this invention to provide a novel process of producing the pyrazolone derivatives described above without being accompanied by the faults mentioned above.

Thus, the invention provides a process for preparing pyrazolone derivatives represented by the following general formula (I)

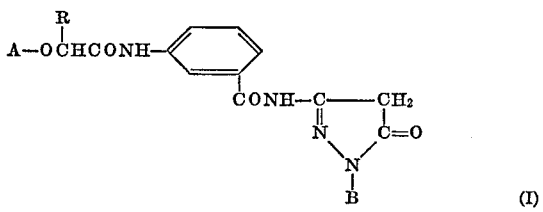

(I)

wherein A, B and R have the same meanings as defined above, which comprises condensing a compound represented by the following general formula (II)

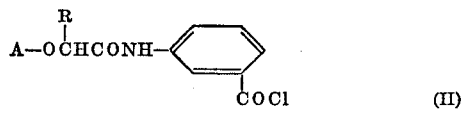

(II)

wherein A and R have the same meanings as defined above, and a compound represented by the following general formula (III)

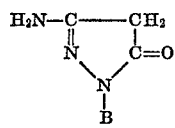

wherein B has the same meaning as defined above, in acetonitrile.

Generally, any of the groups $R_1$, $R_2$ and X may, so long as the above general definitions are met, be a moiety as used in the coupler art.

Certain preferred classes of materials exist, however. For example, $R_1$ and $R_2$ when alkyl have 1–20 carbon atoms including straight or branched chain alkyl groups, e.g., methyl, isopropyl, tertiary amyl, hexyl, octyl, dodecyl, hexadecyl, octadecyl, etc. When alkyl the group preferably has 1–4 carbon atoms; when alkoxy the group has 1–4 carbon atoms; when aryl the group includes many materials, e.g., phenyl, alkylsulfonyl-substituted phenyl aryl sulfonyl-substituted phenyl; and when aryloxyl the group preferably includes compounds such as e.g., phenoxy alkyl-substituted phenoxy, etc.

In the process of this invention, the reaction is conducted without the formation of a weakly-soluble intermediate compound, m-nitrobenzoylamide pyrazolone, and even considering the step of preparing the aforesaid compound of general formula (II), it is unnecessary in the early step of the reaction to use the expensive pyrazolone nucleus. Consequently, the operation for the reaction of this invention is conducted more easily than in the conventional process, the production cost is low and the product yield is high. The molar ratio of Compound II:Compound III can be varied, put preferably is about 1 to about 1.2:1 to obtain best results. However, variation is permitted from this range.

The condensation reaction mentioned above is conducted in acetonitrile and for conducting the condensation reaction, it is desirable that the conditions be such that a hydrochloride or an amine salt of the product which is substantially insoluble in the acetonitrile be formed as the intermediate product. The intermediate product thus prepared may be suitably treated with a base or an acid to yield the final product. In such conditions, the desired product, untreated raw materials and by-product can be easily separated from each other, which increases product yield. The ratio of Compound III:Acetonitrile (preferred ratio) is from about 1 part by weight:about 1 to about 5 parts by volume. However, it will be appreciated the exact amount of solvent is not overly critical.

In this case, in order to form the hydrochloride, the reaction is conducted in a closed system using for example an autoclave or in an open system under normal pressure at temperatures lower than the boiling point of acetonitrile, e.g., usually at 60–75° C. In short, the condensation reaction may be conducted while preventing hydrogen chloride which is released as the reaction progress from being removed from the reaction system. Also, in the case of obtaining the amine salt as the intermediate product, the reaction may be conducted in acetonitrile at the boiling point of acetonitrile in the presence of a tertiary amine.

Any tertiary amine may be used. Usually, from about 2 to about 3 moles of tertiary amine per 1 mole of product is preferably used, though greater and lesser amounts are useful.

The pressure of reaction is not critical per se. In order to prevent escaping HCl gas which is formed during the reaction and used to form an HCl salt of the product an autoclave is usually employed. The pressure depends substantially on the HCl gas. Usually, it is below about 2 kg./cm.$^2$.

The autoclave reaction is usually below 120° C., preferably below 110° C. The temperature is, of course, selected to avoid decomposition.

DETAILED DESCRIPTION OF THE PREFERRED EMBODIMENTS OF THE INVENTION

The starting material of the general formula (II) as used in the process of this invention can be readily obtained by reaction the acetylchloride derivative having general formula

(IV)

wherein A and R have the same meanings as defined above, with m-aminobenzoic acid and thionyl chloride successively as shown in the following reaction schematic:

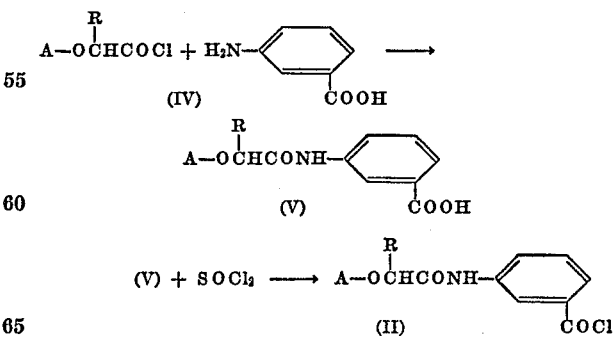

The preferred couplers having the general formula (I) produced by the process of this invention are those of the general formula (I) in which A is

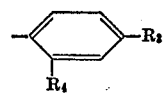

(wherein $R_3$ and $R_4$, which may be the same or different, each represents an alkyl group having 1–5 carbon atoms) or

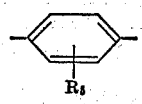

(wherein $R_5$ represents an alkyl group having 1–20 carbon atoms).

Practical examples include the following groups:

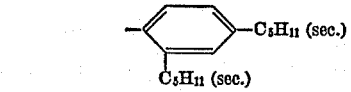

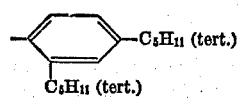

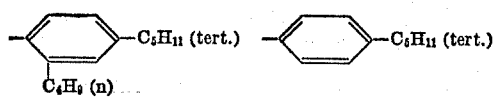

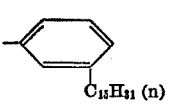

Practical examples of B in formula (I) are illustrated below:

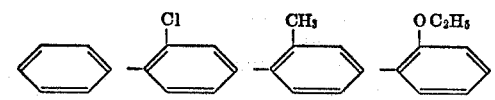

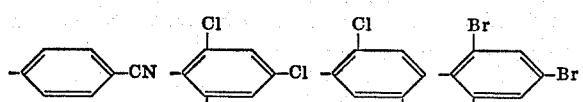

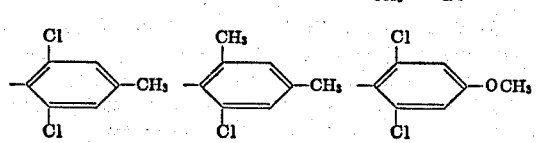

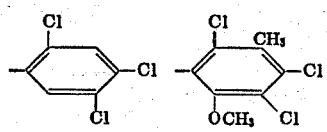

Typical examples of couplers represented by general formula (I) produced by the process of this invention are as follows:

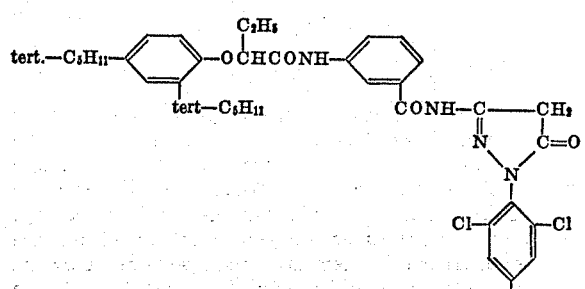

(1)

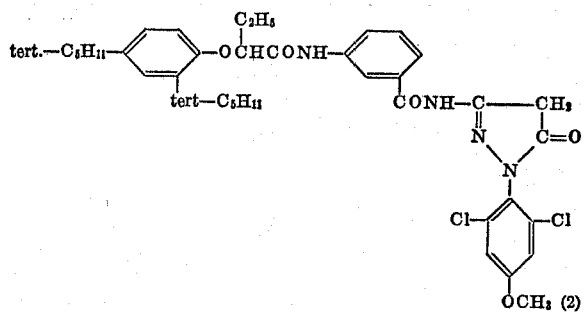

(2)

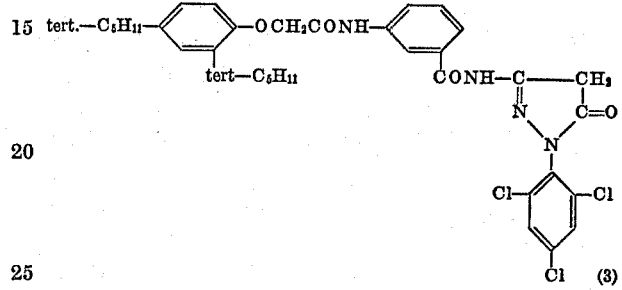

(3)

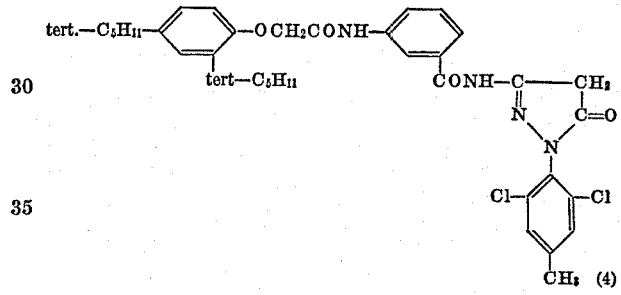

(4)

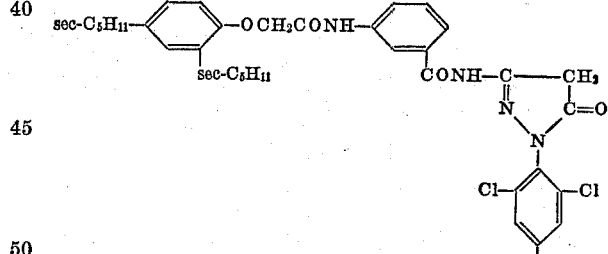

(5)

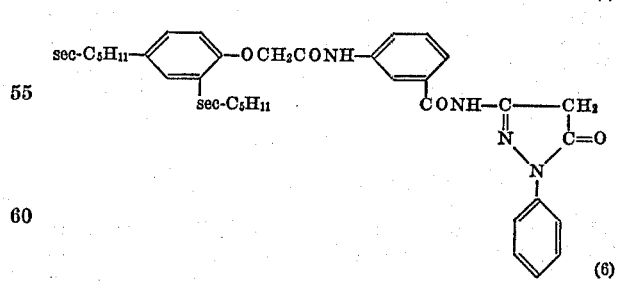

(6)

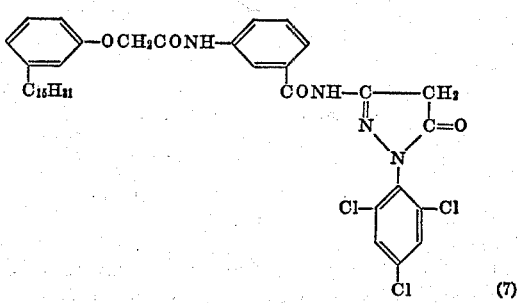

(7)

The present invention is explained further in detail by the following examples.

EXAMPLE 1

Production of compound (1)

32.9 g. (0.24 mole) of m-aminobenzoic acid was suspended in 228 ml. of acetone and then an acetone solution of 67.7 g. (0.20 mol) of α-(2,4-di-tert-amyl)-phenoxybutyroyl chloride and an aqueous solution of 9.6 g. (0.24 mol) of sodium hydroxide were added dropwise simultaneously to the suspension in 30 minutes at a reaction temperature of lower than 25° C. After the addition of the solutions, the mixture was stirred for 30 minutes and after the reaction was over, the reaction product solution was acidified by adding 5% hydrochloric acid, whereby white crystals were precipitated. By filtering the crystals, washing with water and drying them 81 g. (yield 92%) of the carboxylic acid represented by the formula (V) having a melting point of 144° C. was obtained.

43.8 g. (0.10 mol) of the carboxylic acid thus obtained and 20.2 g. (0.17 mol) of thionyl chloride were dissolved in 50 ml. of benzene and after adding a small amount DMF to the solution, the resultant mixture was reacted for 90 minutes at a reaction temperature of 55–60° C. After the reaction was over, the reaction product was completely concentrated under reduced pressure and the acid chloride having a melting point of 88° C. was quantitatively obtained.

200 g. (0.44 mol) of the acid chloride thus obtained, 111 g. (0.44 mol) of 1-(2,4,6-trichloro)phenyl-3-amino-5-pyrazolone and 550 ml. of acetonitrile were reacted for 5 hours at 95° C. in an autoclave at 1.7 kg./cm.$^2$. After the reaction was over, the hydrochloride of compound (1) was separated by filtration. The hydrochloride obtained was dissolved in methanol, the solution was rendered basic by the addition of triethylamine (pH below 8), and excessive base was neutralized with p-toluenesulfonic acid (pH after neutralization 4–5). The reaction product solution was allowed to stand and the crystals precipitated were separated by filtration. The crystals after washing with methanol, were dried to give 223 g. (yield 75%) of compound (1) having a M.P. of 148° C.

EXAMPLE 2

Production of compound (2)

200 g. (0.44 mol) of the acid chloride prepared in Example 1, 109 g. (0.44 mol) of 1-(2,6-dichloro-4-methoxy)phenyl-3-amino-5-pyrazolone, and 60 ml. of acetonitrile were reacted for 5 hours at 95° C. in an autoclave. By treating the product as in Example 1, 195 g. (yield 70%) of compound (2) having a M.P. of 188° C. were obtained.

EXAMPLE 3

Production of compound (3)

By conducting the same synthesis as in Example 1 using 2,4-di-tert-amylphenoxyacetyl chloride instead of α-(2,4-di-tert-amyl)-phenoxybutyroyl chloride, the intermediate product represented by formula (V) having a M.P. of 210° C. was obtained at a yield of 91%. By further treating the intermediate product thus obtained according to the procedure of Example 1, compound (3) having a M.P. of 175° C. was obtained at a yield of 75%.

EXAMPLE 4

Production of compound (4)

By conducting the synthesis as in Example 3 but using 1-(2,6-dichloro-4-methyl)phenyl-5-amino-5-pyrazolone as the aminopyrazolone, compound (4) having a M.P. of 150° C. was obtained at a yield of 70%.

EXAMPLE 5

Production of compound (5)

By conducting the synthesis as in Example 1 except using 2,4-di-sec-amylphenoxyacetyl chloride, compound (5) having a M.P. of 178° C. was obtained at a yield of 65%.

EXAMPLE 6

Production of compound (6)

By conducting the synthesis as in Example 5 but using 1-phenyl-3-amino-5-pyrazolone as the aminopyrazolone, compound (6) was obtained at a yield of 70%.

EXAMPLE 7

Production of compound

By conducting the synthesis as in Example 1 but using 2-pentadecylphenoxyacetyl chloride, compound (7) was obtained at a yield of 65%.

What is claimed is:

1. A process for the preparation of a pyrazolone derivative represented by the following formula (I):

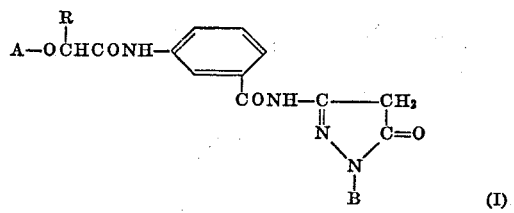

wherein R represents a member selected from the group consisting of a hydrogen atom and an alkyl group having 1–6 carbon atoms; A represents

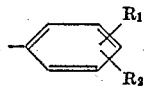

wherein $R_1$ is a member selected from the group consisting of a hydrogen atom and an alkyl group and $R_2$ is an alkyl group; and B represents

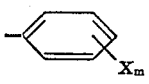

wherein X, which may be the same or different, represents at least one member selected from the group consisting of a hydrogen atom, an alkyl group, an alkoxyl group, an aryl group, an aryloxyl group, a cyano group, and a halogen atom and m is 1–5; which comprises condensing, in acetonitrile, a compound represented by the general formula (II)

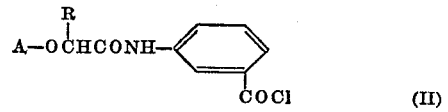

wherein A and R have the same meanings as defined above, with a compound represented by the general formula (III)

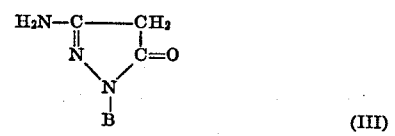

wherein B has the same meaning as defined above to form the hydrochloride salt of said derivative of the formula (I) as an intermediate substantially insoluble in said acetonitrile, said hydrochloride salt derivative being formed by conducting said condensing in a closed system under autogenous or applied pressure or in an open system at normal pressure below the boiling point of said acetonitrile, whereby hydrogen chloride formed in said condensing is retained in the reaction system, and converting said hydrochloride salt intermediate to said derivative of the formula (I).

2. A process according to claim 1, wherein said condensation reaction is carried out in an autoclave.

3. A process for the preparation of a pyrazolone derivative represented by the following general formula (I)

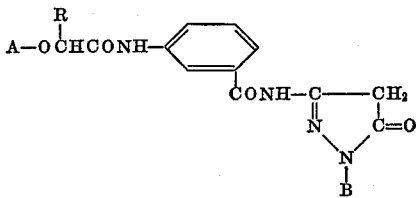

wherein R represents a member selected from the group consisting of a hydrogen atom and an alkyl group having 1-6 carbon atoms; A represents

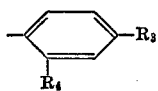

same or different, each represents a member selected from the group consisting of an alkyl group having 1-5 carbon atoms and

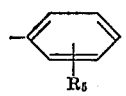

wherein $R_5$ represents an alkyl group having 1-20 carbon atoms; and B represents

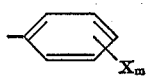

wherein X, which may be the same or different, represents a member selected from the group consisting of a hydrogen atom, an alkyl group, an alkoxyl group, an aryl group, an aryloxyl group, a cyano group, and a halogen atom and $m$ is 1-5; which comprises
condensing, in acetonitrile, a compound represented by the following general formula (II)

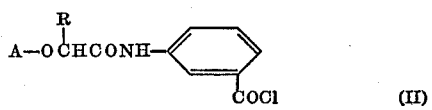

wherein A and R have the same meanings as defined above, with a compound represented by the following general formula (III)

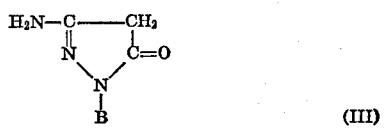

wherein B has the same meaning as defined above to form the hydrochloride salt of said derivative of the formula (I) as an intermediate substantially insoluble in said acetonitrile, said hydrochloride salt derivative being formed by conducting said condensing in a closed system under autogenous or applied pressures or in an open system at normal pressure below the boiling point of said acetonitrile, whereby hydrogen chloride formed in said condensing is retained in the reaction system, and
converting said hydrochloride salt intermediate to said derivative of the formula (I).

4. A process for the preparation of a pyrazolone derivatives represented by the following general formula (I)

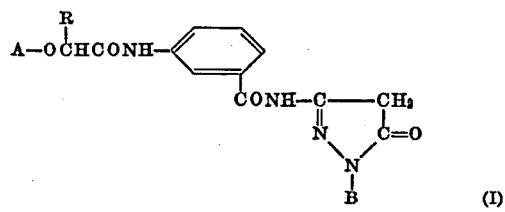

wherein R represents a member selected from the group consisting of a hydrogen atom and an alkyl group having 1-6 carbon atoms; A represents a member selected from the group consisting of

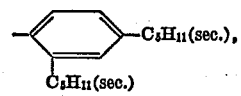

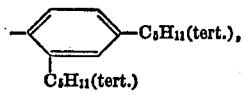

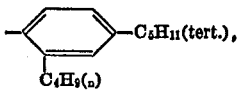

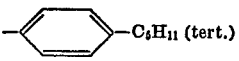

and

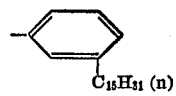

and B represents a member selected from the group consisting of

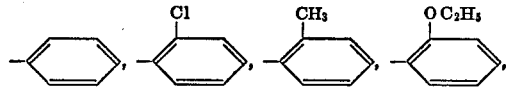

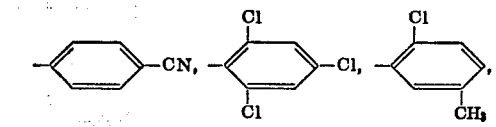

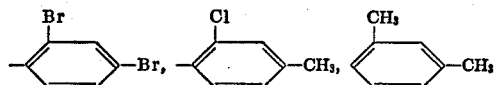

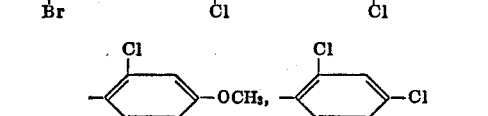

and

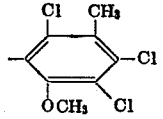

which comprises condensing, in acetonitrile, a compound represented by the following general formula

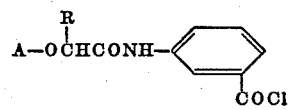

wherein A and R have the same meanings as defined above, and a compound represented by the following general formula

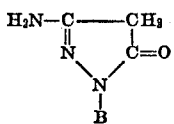

wherein B has the same meaning as defined above to form the hydrochloride salt of said derivative of the formula (I) as an intermediate substantially insoluble in said acetonitrile, said hydrochloride salt derivative being formed by conducting said condensing in a closed system under autogenous or applied pressures or in an open system at normal pressure below the boiling point of said acetonitrile, whereby hydrogen chloride formed in said condensing is retained in the reaction system, and converting said hydrochloride salt intermediate to said derivative of the formula (I).

5. A process for prepatation of a pyrazolone derivative of the formula (I)

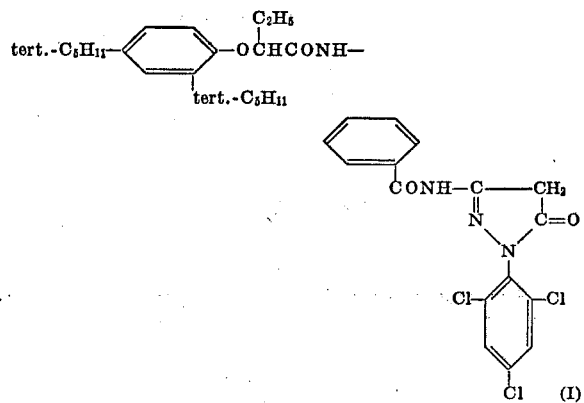

which comprises condensing a compound of the formula

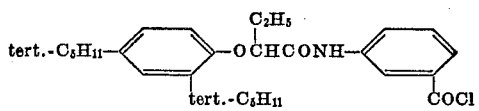

and a compound of the formula

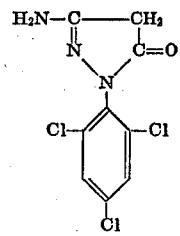

in acetonitrile to form the hydrochloride salt of said derivative of the formula (I) as an intermediate substantially insoluble in said acetonitrile, said hydrochloride salt derivative being formed by conducting said condensing in a closed system under autogenous or applied pressures or in an open system at normal pressure below the boiling point of said acetonitrile, whereby hydrogen chloride formed in said condensing is retained in the reaction system, and converting said hydrochloride salt intermediate to said derivative of the formula (I).

6. A process for preparation of a pyrazolone derivative of the formula (I)

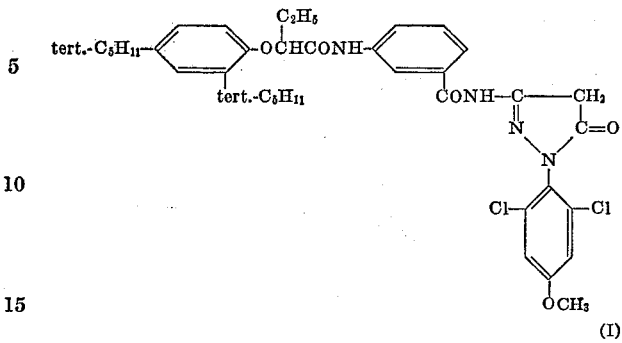

which comprises condensing a compound of the formula

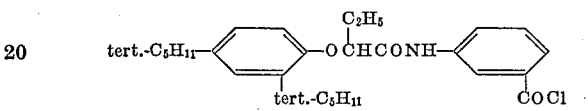

and a compound of the formula

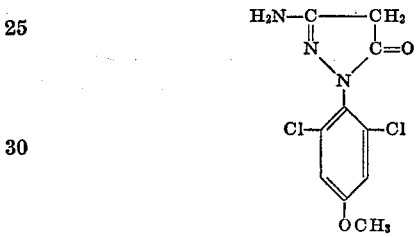

in acetonitrile to form the hydrochloride salt of said derivative of the formula (I) as an intermediate substantially insoluble in said acetonitrile, said hydrochloride salt derivative being formed by conducting said condensing in a closed system under autogenous or applied pressures or in an open system at normal pressure below the boiling point of said acetonitrile, whereby hydrogen chloride formed in said condensing is retained in the reaction system, and converting said hydrochloride salt intermediate to said derivative of the formula (I).

7. A process for preparation of a pyrazolone derivative of the formula (I)

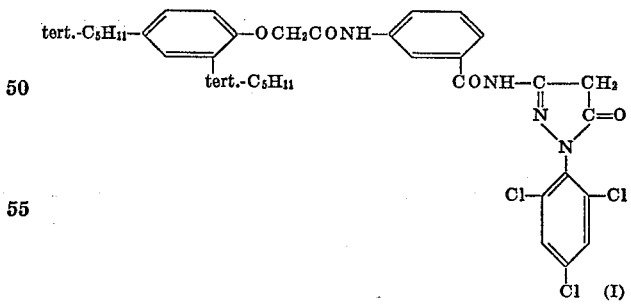

which comprises condensing a compound of the formula

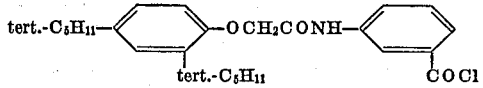

and a compound of the formula

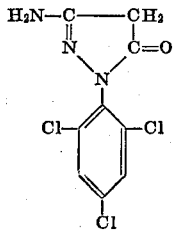

in acetonitrile to form the hydrochloride salt of said derivative of the formula (I) as an intermediate substantially insoluble in said acetonitrile, said hydrochloride salt derivative being formed by conducting said condensing in a closed system under autogenous or applied pressures or in an open system at normal pressure below the boiling point of said acetonitrile, whereby hydrogen chloride formed in said condensing is retained in the reaction system, pressure below the boiling point of said acetonitrile, whereby hydrogen chloride formed in said condensing is retained in the reaction system, and converting said hydrochloride salt intermediate to said derivative of the formula (I).

8. A process for preparation of a pyrazolone derivative of the formula (I)

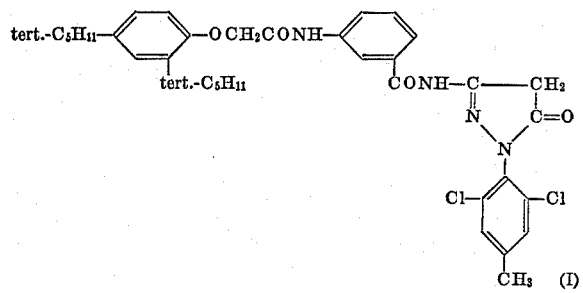

which comprises condensing a compound of the formula

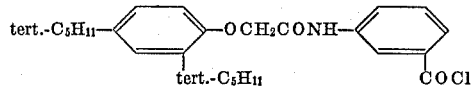

and a compound of the formula

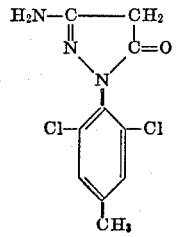

in acetonitrile to form the hydrochloride salt of said derivative of the formula (I) as an intermediate substantially insoluble in said acetonitrile, said hydrochloride salt derivative being formed by conducting said condensing in a closed system under autogenous or applied pressures or in an open system at normal pressure below the boiling point of said acetonitrile, whereby hydrogen chloride formed in said condensing is retained in the reaction system, and converting said hydrochloride salt intermediate to said derivative of the formula (I).

9. A process for preparation of a pyrazolone derivative of the formula (I)

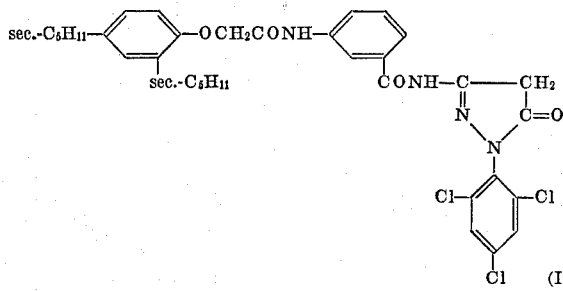

which comprises condensing a compound of the formula

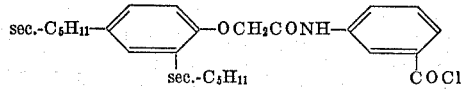

and a compound of the formula

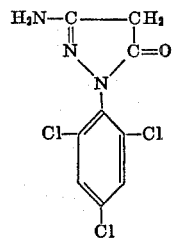

in acetonitrile to form the hydrochloride salt of said derivative of the formula (I) as an intermediate substantially insoluble in said acetonitrile, said hydrochloride salt derivative being formed by conducting said condensing in a closed system under autogenous or applied pressures or in an open system at normal pressure below the boiling point of said acetonitrile, whereby hydrogen chloride formed in said condensing is retained in the reaction system, and converting said hydrochloride salt intermediate to said derivative of the formula (I).

10. A process for preparation of a pyrazolone derivative of the formula (I)

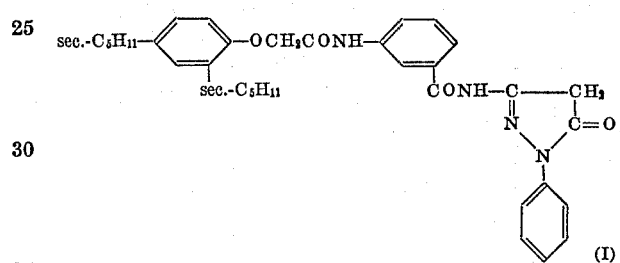

which comprises condensing a compound of the formula

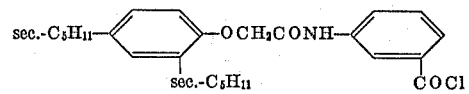

and a compound of the formula

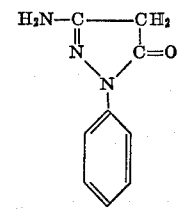

in acetonitrile to form the hydrochloride salt of said derivative of the formula (I) as an intermediate substantially insoluble in said acetonitrile, said hydrochloride salt derivative being formed by conducting said condensing in a closed system under autogenous or applied pressures or in an open system at normal pressure below the boiling point of said acetonitrile, whereby hydrogen chloride formed in said condensing is retained in the reaction system, and converting said hydrochloride salt intermediate to said derivative of the formula (I).

11. A process for preparation of a pyrazolone derivative of the formula (I)

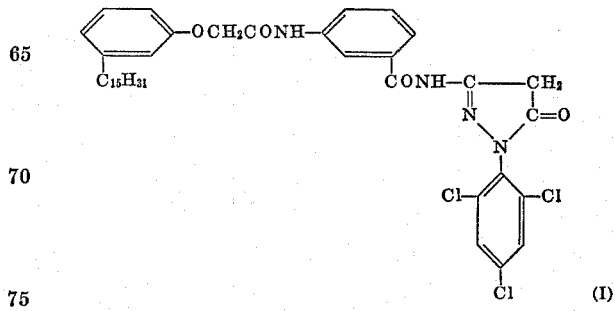

which comprises condensing a compound of the formula

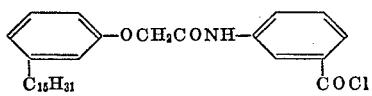

and a compound of the formula

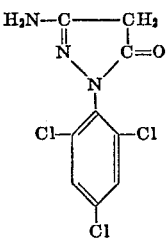

in acetonitrile to form the hydrochloride salt of said derivative of the formula (I) as an intermediate substantially insoluble in said acetonitrile, said hydrochloride salt derivative being formed by conducting said condensing in a closed system under autogenous or applied pressures or in an open system at normal pressure below the boiling point of said acetonitrile, whereby hydrogen chloride formed in said condensing is retained in the reaction system, and converting said hydrochloride salt intermediate to said derivative of the formula (I).

12. The process of claim 1 where the pressure of the reaction is below about 2 kg./cm.$^2$.

13. The process of claim 12 where the temperature is below about 120° C.

14. The process of claim 1, wherein the condensation is below the boiling point of acetonitrile at a temperature of 60 to 75° C.

15. The process of claim 1, wherein said conversion comprises treating said hydrochloride intermediate with a base.

16. The process of claim 1 where the molar ratio of compound (II) to compound (III) is from about 1 to about 1.2:1.

17. The process of claim 1 where the ratio of compound (III) to acetonitrile is from about 1 part by weight:about 1 to about 5 parts by volume.

References Cited

UNITED STATES PATENTS

| | | | |
|---|---|---|---|
| 2,865,751 | 12/1958 | Feniak et al. | 260—310 A |
| 3,062,653 | 11/1962 | Weissberger et al. | 260—310 A |
| 3,615,504 | 10/1971 | Monbaliu et al. | 260—310 A |

HENRY R. JILES, Primary Examiner

S. D. WINTERS, Assistant Examiner

U.S. Cl. X.R.

260—519, 544 M